(12) United States Patent
Shivashankar et al.

(10) Patent No.: US 10,375,593 B2
(45) Date of Patent: Aug. 6, 2019

(54) ANALYSIS OF CONNECTION PATTERNS IN A COMMUNICATION NETWORK

(71) Applicant: Telefonaktiebolaget LM Ericsson (publ), Stockholm (SE)

(72) Inventors: Subramanian Shivashankar, Chennai (IN); Ankur Dauneria, New Delhi (IN); Saket Gurukar, Chennai (IN); Sayan Ranu, Chennai (IN); Balaraman Ravindran, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 15/524,214

(22) PCT Filed: Nov. 4, 2014

(86) PCT No.: PCT/SE2014/051303
§ 371 (c)(1),
(2) Date: May 3, 2017

(87) PCT Pub. No.: WO2016/072889
PCT Pub. Date: May 12, 2016

(65) Prior Publication Data
US 2017/0339590 A1    Nov. 23, 2017

(51) Int. Cl.
*H04W 24/08*  (2009.01)
*H04W 76/11*  (2018.01)
(Continued)

(52) U.S. Cl.
CPC ........... *H04W 24/08* (2013.01); *H04L 5/0067* (2013.01); *H04W 24/02* (2013.01); *H04W 76/11* (2018.02)

(58) Field of Classification Search
CPC .... H04L 5/0067; H04W 24/02; H04W 24/08; H04W 76/11
See application file for complete search history.

(56) References Cited

U.S. PATENT DOCUMENTS

| | | | | |
|---|---|---|---|---|
| 2004/0250134 A1* | 12/2004 | Kohler, Jr. | ......... | H04L 63/1425 726/23 |
| 2006/0173992 A1* | 8/2006 | Weber | ................ | H04L 63/1425 709/224 |

(Continued)

FOREIGN PATENT DOCUMENTS

WO    2005/064850 A1    7/2005

OTHER PUBLICATIONS

International Search Report and Written Opinion issued in International Application No. PCT/SE2014/051303, dated Aug. 7, 2015, 11 pages.

(Continued)

*Primary Examiner* — Asad M Nawaz
*Assistant Examiner* — Saad A. Waqas
(74) *Attorney, Agent, or Firm* — Sage Patent Group

(57) ABSTRACT

The present disclosure relates to a method performed by a network node (54) in a communication network (50) comprising a plurality of communication devices (51), for finding temporally connected connection patterns of the communication devices in the network. The method comprises identifying signalling between the communication devices during a predefined time duration to form a main communication graph in which the plurality of communication devices are nodes. The method also comprises partitioning the main communication graph for a time period comprised in said time duration to capture temporally connected signalling between some of the communication devices as illustrated in the main communication graph in a partitioned communication graph. The method also comprises forming at least one subgraph from the partitioned communication graph, comprising m nodes corresponding to m communication devices of said some of the communication devices. The method also comprises constructing a binary vector of (Continued)

the subgraph over the time period divided into a plurality of sampling periods corresponding to components in the vector such that, for each component in the vector, the component value is set to "1" if, in accordance with the subgraph, signalling occurs between at least two of the m communication devices during the sampling period corresponding to the element, and the component value is otherwise set to "0". The method also comprises testing whether the signalling between the different m communication devices used for constructing the binary vector is temporally connected by checking that the number of consecutive "0" element(s), if any, between any two "1" elements is less than a predefined $\Delta T$.

14 Claims, 11 Drawing Sheets

(51) Int. Cl.
*H04W 24/02* (2009.01)
*H04L 5/00* (2006.01)

(56) References Cited

U.S. PATENT DOCUMENTS

| | | | | |
|---|---|---|---|---|
| 2011/0289207 | A1* | 11/2011 | Liu | H04L 41/12 709/224 |
| 2013/0322413 | A1* | 12/2013 | Pelletier | H04W 72/1289 370/336 |
| 2014/0369251 | A1* | 12/2014 | Zhang | H04W 4/08 370/312 |
| 2015/0230160 | A1* | 8/2015 | Lin | H04W 76/18 370/252 |
| 2017/0164320 | A1* | 6/2017 | Holleis | H04L 41/145 |

OTHER PUBLICATIONS

Kovanen, Lauri et al., "Temporal motifs reveal homophily, gender-specific patterns, and group talk in call sequences," PNAS, vol. 110 No. 45., Nov. 5, 2013, pp. 18070-18075.
3GPP TS 22.368 V11.6.0, 3rd Generation Partnership Project; Technical Specification Group Services and System Aspects; Service requirements for Machine-Type Communications (MTC); Stage 1 (Release 11), Sep. 2012, 21 pages.
Kovanen, Lauri, "Temporal motifs in time-dependent networks," J. Stat. Mech. (2011) P11005, Oct. 2011, 18 pages.
ETSI TS 102 690 V2.1.1,"Machine-to-Machine communications (M2M); Functional Architecture," Oct. 2013, 332 pages.

* cited by examiner

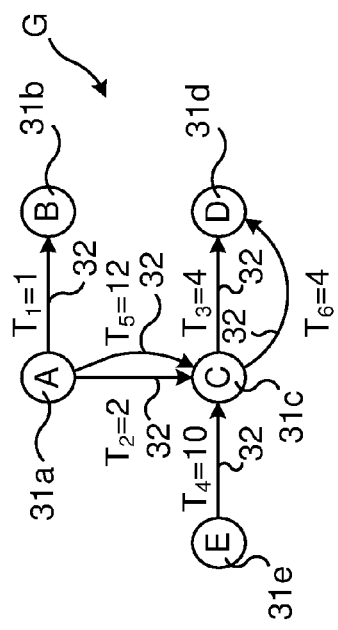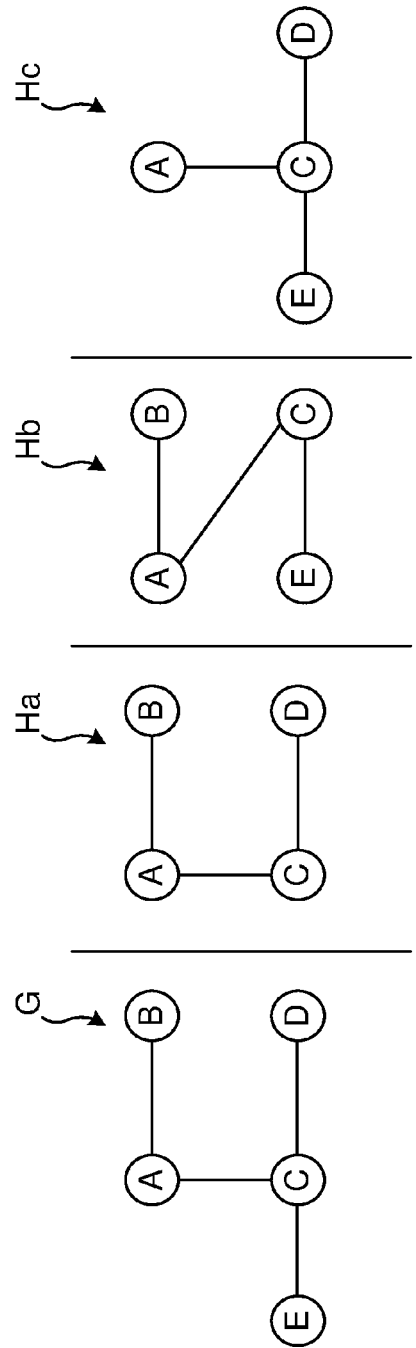

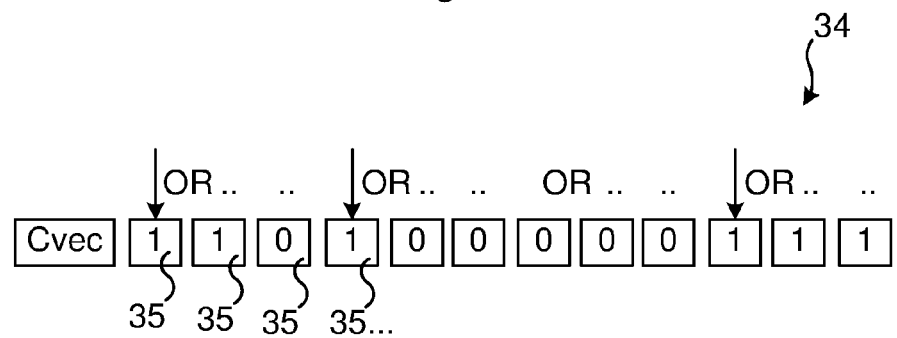
Fig. 3f
Fig. 3g
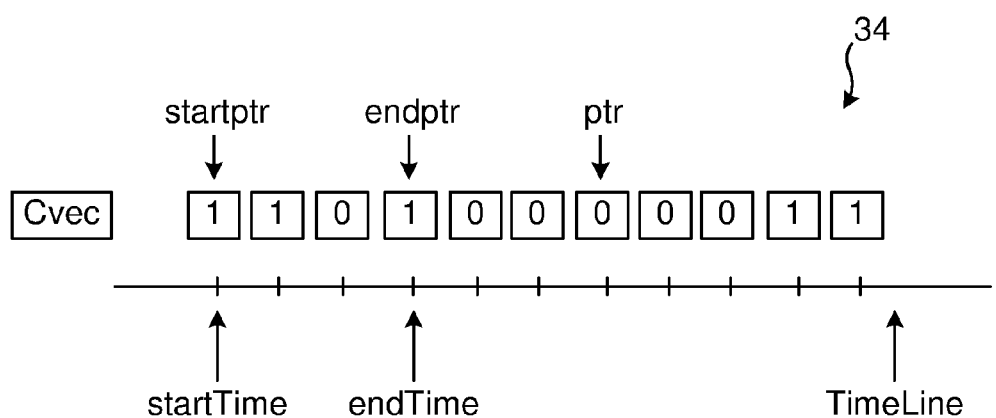
Fig. 4

Algorithm 1 GraphPartition(Graph, $\Delta T$)

1: Mark all edges as not visited.
2: while All edges are NOT visited do
3:    Create an empty graph G.
4:    Chose a random not visited edge e, push it on S.
5:    while S not empty do
6:       Pop edge e from S.
7:       Add edge e in Graph G.
8:       If the time difference between e and it's neighbour edge e' is within $\Delta T$, then push e' on S.
9:    Add Graph G into set of graphs.

Fig. 10a

MiningTemporalMotifs (Graph, m, ΔT, start, end)

1: for each *vertex* in MotifVertexList do
2:   for each *set* in MotifVertexList [vertex] do
3:     Form a induced subgraph H with vertices as *vertex* and *set* in timeperiod [start, end].
4:     Create Column Vector of H.
5:     DetectMotifs (ColumnVector, T, H, start, end, m).
6:   end for
7: end for

Fig. 10b

DetectMotifs (ColumnVector, ΔT, subgraph, start, m)

1: i = flag = 0.
   startptr = endptr = ptr = -1.
2: while i < ColumnVector.Length do
3:   if ColumnVector [i] == 1 then
4:     endptr = ptr = i.
5:     if startptr == -1 then
6:       startptr=i, flag=1.
7:     end if
8:   else
9:     ptr = i.
10:    if ptr − endptr > T and flag == 1 then
11:      CountMotif (subgraph, start, startptr, endptr, m)
12:      startptr=-1, flag=0.
13:    end if
14:   end if
15:   i = i+1.
16: end while
17: if startptr ≠ -1 then
18:   CountMotif ( subgraph, start, startptr, endptr, m)
19: end if

Fig. 11

ANALYSIS OF CONNECTION PATTERNS IN A COMMUNICATION NETWORK

CROSS REFERENCE TO RELATED APPLICATION(S)

This application is a 35 U.S.C. § 371 National Stage of International Patent Application No. PCT/SE2014/051303, filed Nov. 4, 2014, designating the United States, the disclosure of which is incorporated by reference.

TECHNICAL FIELD

The present disclosure relates to a method performed by a network node in a communication network comprising a plurality of communication devices, for finding temporally connected connection patterns of the communication devices in the network.

BACKGROUND

In a machine-to-machine (M2M) ecosystem, one of the possibilities with Networked Society, there will be billions of M2M Devices relating to various services and applications. A networked society would comprise of billions of connections. Mobile phone subscriptions may surpass world population by 2015. M2M connections are expected to increase 3-4 times by 2019. Each year, telecommunication network operators spend around USD 15 billion in dealing with outages and disruptions. Outages can be of different types like service, application, network, power or device outages. Outage recovery intelligence in a networked society involving billions of devices is an emerging focus area for operators.

As per the European Telecommunications Standards Institute (ETSI) M2M specification, the M2M functional architecture is as given in FIG. 1. A M2M device may be defined as a device that runs M2M Application(s) using M2M Service Capabilities. M2M devices can be stationary, mobile, main powered or battery powered. M2M Devices connect to Network Domain in accordance with either case 1 or case 2 below and as illustrated in FIG. 1.

Case 1—"Direct Connectivity": M2M devices connect to the network domain via the access network. The M2M device performs the procedures such as registration, authentication, authorization, management and provisioning with the network domain. The M2M device may provide services to other devices (e.g. legacy devices) connected to it that are hidden from the network domain.

Case 2—"Gateway as a Network Proxy": The M2M device connects to the network domain via an M2M gateway. M2M devices connect to the M2M gateway using the M2M area network. The M2M gateway acts as a proxy for the network domain towards the M2M devices that are connected to it. Examples of procedures that use proxies include: authentication, authorization, management, and provisioning. M2M devices may be connected to the network domain via multiple M2M gateways.

Some examples of machine type communication applications are listed in the following table 1. This list is not exhaustive and is intended to be indicative of the scope of machine type communication applications.

TABLE 1

| Service Area | MTC applications |
|---|---|
| Security | Surveillance systems |
|  | Backup for landline |
|  | Control of physical access (e.g. to buildings) |
|  | Car/driver security |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimization/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/Control | Sensors |
|  | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

As per current state of art, device connectivity is managed by operators using products like the Ericsson Device Connection Platform (DCP) which is a cloud service enabling operators to offer connectivity management to enterprise customers, or another hosted core network (CN) or home public land mobile network (Home PLMN or HPLMN) which may be used by several different network operators to manage subscriptions for radio devices. The platform supports operators in building up the M2M business from three perspectives, managed connectivity through the life cycle, sales preparation and business expansion. Thus, such a hosted network may host a multi-tenant home location register (HLR) and other core network nodes (Gateway General Packet Radio Service (GPRS) support node (GGSN), short message service centre (SMSC), etc.) in HPLMN as a core network service for all customer operators. All the M2M subscribers of the operators may be registered and stored on hosted HLR. Connectivity may be provided as a service to all operators hosted on the platform. On top of the core network service, also a cloud business support system (BSS) may be hosted to provision and manage subscriber data, processes, billing, etc.

A device first connects to the network; a connected device is then able to participate in request/response messages with other nodes in interaction. If there is an outage, then devices disconnect from the network. Once the outage is over, disconnected devices reconnect back to the network to resume what they were doing before the outage.

Temporal networks are commonly used to represent systems where connections have the dimension of time: such as telecommunication, neural signal processing, biochemical reactions and human social interaction networks. For instance, calls made between different user nodes at various timestamps can be represented using a temporal graph.

During outages, millions of devices (or graph nodes/vertices) disappear (are disconnected) from the network and once the outage is over those devices reconnect over a certain amount of time. Since the network performance may vary at different location due to change in signal strength, bandwidth, quality of service (QoS), cell site performance parameters, the reconnection pattern is typically not uniform. This leads to differences in re-connection patterns of billions of M2M devices/device-groups spread across the operator's network. During outage recovery, understanding such reconnection patterns of devices to a network will help an operator of the network to manage network resources efficiently.

SUMMARY

A network society with billions of stationary and mobile devices, presents lots of challenges for a network operator during an outage recovery. Each device relates to some M2M application or service. Due to device location, device mobility, heterogeneous cell sites and received network performance by devices, it is quite likely that many of these devices would not receive an equal network performance.

When such a large volume of devices, reconnects back to the network, operators benefit from some intelligence to reduce network disruptions or another outage due to these billions of devices recovering from an outage and reconnecting back to network in an uneven performing network. The number of devices reconnecting back to the network at a time would differ in uneven performing networks. This scenario magnifies in an heterogeneous network where an impact on a cell site would differ every time. Further, all connected M2M ecosystems identities would be impacted (for example M2M application, services, service capability layers, M2M node, M2M subscription etc).

That billions of devices of different types, locations relating to various applications and services, receiving differing network performance, are recovering from an outage and reconnecting back to network nodes presents a scenario which operators should consider.

Operators therefore, require some intelligence to understand the number of devices, types and temporal patterns at a time, in which a M2M ecosystem recovers from an outage in an uneven performing network. In the existing state-of-the-art, neither the policy charging and control node (PCC) nor the DCP has any knowledge about such temporal reconnection patterns which therefore severely limits operators in efficiently managing the recovery of M2M network from an outage in an uneven network performing scenarios. There are no existing scalable approaches to mine these networks with simultaneous links. The task of finding frequent re-connection patterns involves two steps. (1) Mining temporal motifs (2) Ranking patterns. Both are important problems because of the scale of devices connected to each other (scale of graph). Secondly, there are no existing scalable methods to handle simultaneous links, for example when multiple nodes interact with each other, like in a group mail or conference call. The present disclosure focuses on the first step, to mine temporal patterns from a large connection graph such as a M2M devices network.

The present disclosure proposes a scalable temporal pattern mining method to discover useful reconnection patterns. The devices and their connections are treated as a graph, and a temporal motif detection method is proposed to discover patterns. Though reconnection patterns are of special interest, the proposed method is generic and can handle both disconnection and reconnection pattern mining. Using the mined knowledge, it would be possible to optimize network resources for a given utility criterion.

Disconnection or reconnection patterns to a network node like a cell site/base station may be influenced by the following factors: current load of a cell site (static, moving); mobility of devices (stationary, mobile); device type; some specific priority by Operators etc; connection demand patterns influencing the load or future load with respect to user already present or incoming; cell site performance parameters; cell site configuration parameters; cell site type—femto, pico, micro, metro, macro cell; network technologies used like the third generation of mobile telecommunications technology (3G) e.g. the Universal Mobile Telecommunications System (UMTS), fourth generation of mobile telecommunications technology (4G) e.g. Long Term Evolution (LTE), wireless local area network (WLAN) e.g. Wi-Fi, etc.; network latency; bandwidth; QoS; etc.

In short, the proposed method would help in discovering patterns which would be driven by one or more of the above mentioned factors.

According to an aspect of the present disclosure, there is provided a method performed by a network node in a communication network comprising a plurality of communication devices, for finding temporally connected connection patterns of the communication devices in the network. The method comprises identifying signalling between the communication devices during a predefined time duration to form a main communication graph in which the plurality of communication devices are nodes. The method also comprises partitioning the main communication graph for a time period comprised in said time duration to capture temporally connected signalling between some of the communication devices as illustrated in the main communication graph in a partitioned communication graph. The method also comprises forming at least one subgraph from the partitioned communication graph, comprising m nodes corresponding to m communication devices of said some of the communication devices. The method also comprises constructing a binary vector of the subgraph over the time period divided into a plurality of sampling periods corresponding to components in the vector such that, for each component in the vector, the component value is set to "1" if, in accordance with the subgraph, signalling occurs between at least two of the m communication devices during the sampling period corresponding to the element, and the component value is otherwise set to "0". The method also comprises testing whether the signalling between the different m communication devices used for constructing the binary vector is temporally connected by checking that the number of consecutive "0" element(s), if any, between any two "1" elements is less than a predefined $\Delta T$.

According to another aspect of the present disclosure, there is provided a computer program product comprising computer-executable components for causing a network node to perform an embodiment of the method of the present disclosure when the computer-executable components are run on processor circuitry comprised in the network node.

According to another aspect of the present disclosure, there is provided a network node for a communication network comprising a plurality of communication devices. The node is configured for finding temporally connected connection patterns of the communication devices in the network. The network node comprises processor circuitry, and a storage unit storing instructions executable by said processor circuitry whereby said network node is operative to identify signalling between the communication devices during a predefined time duration to form a main communication graph in which the plurality of communication devices are nodes. The node is also operative to partition the main communication graph for a time period comprised in said time duration to capture temporally connected signalling between some of the communication devices as illustrated in the main communication graph in a partitioned communication graph. The node is also operative to form at least one subgraph from the partitioned communication graph, comprising m nodes corresponding to m communication devices of said some of the communication devices. The node is also operative to construct a binary vector of the subgraph over the time period divided into a plurality of sampling periods corresponding to components in the vector such that, for each component in the vector, the component value is set to "1" if, in accordance with the subgraph, signalling occurs between at least two of the m communication devices during the sampling period corresponding to the element, and the component value is otherwise set to "0". The node is also operative to test whether the signalling between the different m communication devices used for constructing the binary vector is temporally connected by checking that the number of consecutive "0" element(s), if any, between any two "1" elements is less than a predefined $\Delta T$.

According to another aspect of the present disclosure, there is provided a computer program for finding temporally connected connection patterns of communication devices in a communication network. The computer program comprises computer program code which is able to, when run on processor circuitry of a network node in the communication network, cause the network node to identify signalling between the communication devices during a predefined time duration to form a main communication graph in which the plurality of communication devices are nodes. The code is also able to cause the node to partition the main communication graph for a time period comprised in said time duration to capture temporally connected signalling between some of the communication devices as illustrated in the main communication graph in a partitioned communication graph. The code is also able to cause the node to form at least one subgraph from the partitioned communication graph, comprising m nodes corresponding to m communication devices of said some of the communication devices. The code is also able to cause the node to construct a binary vector of the subgraph over the time period divided into a plurality of sampling periods corresponding to components in the vector such that, for each component in the vector, the component value is set to "1" if, in accordance with the subgraph, signalling occurs between at least two of them communication devices during the sampling period corresponding to the element, and the component value is otherwise set to "0". The code is also able to cause the node to test whether the signalling between the different m communication devices used for constructing the binary vector is temporally connected by checking that the number of consecutive "0" element(s), if any, between any two "1" elements is less than a predefined $\Delta T$.

According to another aspect of the present disclosure, there is provided a computer program product comprising an embodiment of the computer program of the present disclosure and a computer readable means on which the computer program is stored.

By means of embodiments of the aspects of the present disclosure, temporal motifs, typically recurring temporal motifs, may be identified when analysing a connection pattern (e.g. disconnection or reconnection) in a communication network, e.g. in connection with an outage in the network, for future reference when dealing with similar outages or other network events.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 3a is a schematic illustration of an example of a main communication graph, in accordance with the present disclosure.

FIG. 3b is a schematic illustration of a partitioned communication graph, from the main communication graph in FIG. 3a, in accordance with the present disclosure.

FIG. 3c is a schematic illustration of a subgraph of the partitioned communication graph in FIG. 3b, in accordance with the present disclosure.

FIG. 3d is a schematic illustration of another subgraph of the partitioned communication graph in FIG. 3b, in accordance with the present disclosure.

FIG. 3e is a schematic illustration of another subgraph of the partitioned communication graph in FIG. 3b, in accordance with the present disclosure.

FIG. 3f is a schematic illustration of a bit matrix of the main communication graph in FIG. 3a, in accordance with the present disclosure.

FIG. 3g is a schematic illustration of a binary column vector of the main communication graph in FIG. 3a, in accordance with the present disclosure.

FIG. 4 is a schematic illustration of how an embodiment of a binary vector is tested for temporal connectedness, in accordance with the present disclosure.

FIG. 10a is an example algorithm for obtaining a partitioned communication graph from a main communication graph, in accordance with the present disclosure.

FIG. 10b is an example algorithm for obtaining a subgraph, and a binary column vector thereof, from a partitioned communication graph, in accordance with the present disclosure.

FIG. 11 is an example algorithm for testing the temporal connectedness of a binary vector, in accordance with the present disclosure.

DETAILED DESCRIPTION

Figure 1:
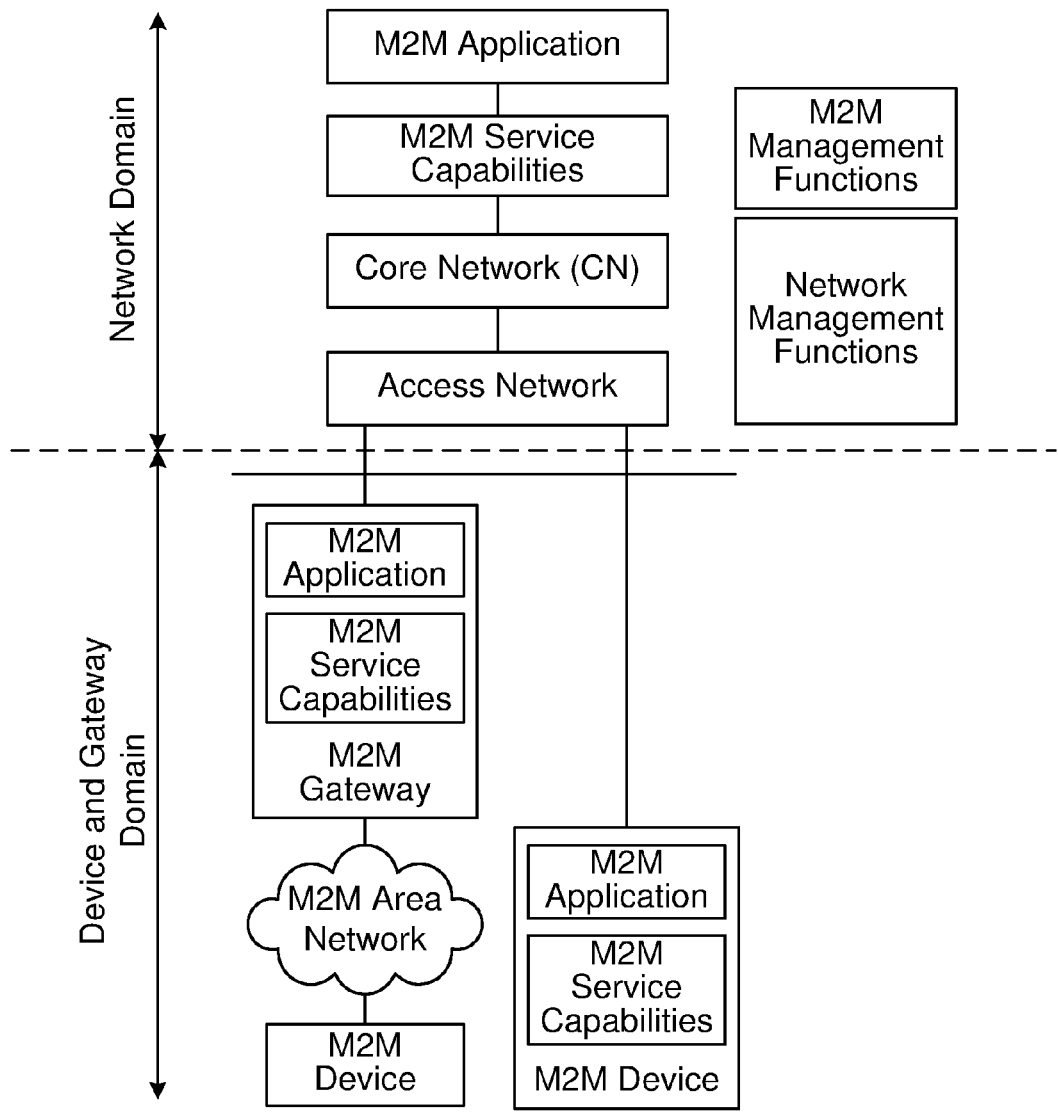
FIG. 1 is a schematic functional block diagram of a M2M connection architecture in accordance with prior art.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

A temporal motif represents a, maybe recurring, subgraph that has a, typically unique, sequence of information flow. Consider the email network of FIG. 2, in which in the left subgraph user B sends a mail to user A and then user A sends a mail to user C. This represents a flow of information from B to C through A. Note that the other (middle and right) two graphs have same structure but they are different temporal motifs. The reason is, in the middle subgraph, A first sends information to C and then to B, but in the right subgraph, A sends information to both B and C at same time and there is difference in sequence of information flow, as illustrated with the different time stamps (100 and 102, respectively) and directions of the communications (herein also called edges) between the nodes/vertices A, B and C.

A formal definition of temporal motif is given below,

Let an event $e_i$ be represented as $<s_i, d_i, t_i, \delta_i>$ where $s_i$ is the source node, $d_i$ is the destination node, $t_i$ is the time of the event and $\delta_i$ is the duration of the event. Temporal motifs are further discussed and defined by Lauri Kovanen et al.—"Temporal motifs in time-dependent networks", J. Stat. Mech. (2011).

A temporal motif is a collection of events $<e_1, e_2, \ldots, e_n>$ such that

1. $\forall i$, there exists j such that $|(s_i, d_i) \cap (s_j, d_j)| > 0$. i.e. motif is connected.

2. $0 < |t_j - t_i - \delta_j| < \Delta T$. i.e. adjacent calls are made in short span of time.

Also note that the definition of temporal motifs of Kovanen et al. is used. In the present disclosure, we propose a scalable technique which uses the bit matrix and column vector (Cvec, herein also called binary vector) representation, for finding temporal motifs. Cvec-test is a filtering approach (shallow approach) to check for temporal validity, and a motif-vertex list is constructed for further processing.

FIGS. 3a-3g illustrates how a binary vector (Cvec) may be obtained from a communication graph G, which is a multi-edged (each communication between two nodes, e.g. between nodes A and C and between nodes C and D, is represented with an arrow) and directed (arrows show the directions of the communications). The communication graph G is typically a partition from a much larger main communication graph which e.g. millions or billions M2M devices represented by nodes. In the communication graph G of FIG. 3a, six communications are shown at six different times, e.g. a communication (e.g. an e-mail is sent) from node A to node C at the time T=2 and again at time T=12. The nodes 31 are referenced as 31a-d and the communications are in the graph called edges 32 illustrated by the arrows between the nodes 31.

The communication graph G may be converted into an undirected single-edged graph as shown in FIG. 3b to in a more simple way show how the different nodes 31 are connected to each other by edges 32. All possible subgraphs H of size m=4 (i.e. consisting four nodes 31) may be calculated. They are shown in FIG. 3c (subgraph Ha), 3d (subgraph Hb) and 3e (subgraph Hc). These subgraphs may be stored in a motif-vertex-list in which any vertex, e.g. node B of subgraph Ha is chosen as key and remaining vertices (A, C, D) are stored as values and hence is stored as {B, {A, C, D}} in the motif-vertex-list. Node B can also be key for subgraph Hb whereby the motif-vertex-list becomes {B, {{A, C, D}, {A, C, E}}}. For a motif of size m, we define the motif-vertex-list of graph G as a multi-map with key as vertex and value as set of vertices of size m−1 such that induced subgraph represents a unique subgraph. In the communication graph G of FIGS. 3a and 3b, the Motif-Vertex-List formed is 1B, {{A, C, D}, {A, C, E}} and {E, {A, C, D}}.

A bit matrix 33 may be formed of the communication graph G, as shown in FIG. 3f. A bit matrix is a binary matrix whose rows represent edges, columns indicate the timestamp of the edges and a value of "0" or "1" in a cell represents absence or presence of edge at the specific time respectively. Thus, for instance, the communications at times T=2 and T=12 between nodes A and C are in the bit matrix represented by "1" in the columns of T=2 and T=12 and the row of the edge A-C.

The bit matrix 33 is herein given for illustrative purposes to show how the binary vector Cvec 34 may be constructed, but it may not be necessary to actually form a bit matrix in order to obtain the vector. Thus, the vector 34 may be obtained by performing a time-wise OR-operation on the columns of the bit matrix 33. At least one communication (edge) at time T=1 thus results in a value "1" in the component 35 for T=1 in the vector 34, and so on for the other components 35 of the vector. The bit matrix 33 and binary vector 34 has here for explanatory purposes been constructed from the graph G. However, in performing embodiments of the method of the present disclosure, the binary vectors 34 are typically formed from submatrices H.

The column vector 34 is a vector such that value of $C_i = E_{\{1i\}} | E_{\{2i\}} | \ldots | E_{\{mi\}}$ where $E_{\{ji\}}$ is value of edge j at time i. For example, bit matrix 33 and column vector 34 of a graph G is as shown in FIG. 3g. The second condition in temporal motif detection, that the edges are temporally connected, is computationally expensive and hence a relax condition of temporal connectivity is proposed. For a graph to be temporally connected if $t_1 > t_2 > \ldots > t_n$, then $|t_i - t_{\{i+1\}}| \leq \Delta T$, where $\Delta T$ is the maximum allowed time difference between two events and i=1 to n−1.

FIG. 4 illustrates how the binary vector 34 can be used for determining whether the motif/graph it is based on represents a temporally connected motif, i.e. whether the communications between the devices as represented by the nodes 31 and edges 32 are close enough in time to each other to be temporally connected. This is done by a so called Cvec test. In the Cvec test, The number of consecutive zeros between any two '1' bits in the Column vector 34 of the graph should be less than $\Delta T$ for the graph to be temporally connected. Consider the column vector shown in FIG. 4 of a subgraph H and with a time difference $\Delta T=4$. A Detect-Motifs algorithm (see FIG. 11, below) finds all the pairs of start pointer (startPtr) and end pointer (endPtr) such that the number of consecutive zeros between any two '1' bit between (startPtr, endPtr) is not greater than $\Delta T$ (Cvec-test). From lemma 1 discussed below, we know that the subgraph identified by Cvec-test is temporally connected. A theoretical evaluation for this method is given below.

Lemma 1: Cvec-Test is passed if and only if graph is temporally connected.

Proof: Since we have if and only if, the proof is divided into two parts

Part A. If graph is temporally connected then it will pass Cvec-Test

1. Assume Cvec-Test fails for a graph which is temporally connected.
2. This implies, ∃ one or m ore than one sequence of consecutive zeros between two '1' bits whose size is at least $\Delta T$. Lets denote consecutive '0' bits as $t_i, t_{i+1}, \ldots, t_k$ such that $k-i+1 \geq \Delta T$.
3. This implies there is no '1' bit in all edges for a period of $t_i, t_{i+1}, \ldots, t_k$ since Cvec is constructed by 'OR'ing.
4. This implies, ∃ a time difference between edges which is greater than $k-i+1 \geq \Delta T$ violating definition of graph to be temporal.

This is contradiction.

Part B: If Graph passes Cvec-Test then Graph is temporally connected.

1. Assume graph passes Cvec-Test but graph is not temporally connected.
2. Since graph is not temporally connected, there e at least one pair of edges whose time difference is greater or equal to $\Delta T$. Lets denote the sequence as $t_i, t_{i+1}, \ldots, t_k$ such that $k-i+1 \geq \Delta T$ where $t_i$ is 1st edge time and $t_k$ is second edge time.
3. This implies all edges in bit matrix of graph will have bit '0' in time period $t_i, t_{i+1}, \ldots, t_k$ and hence $t_i, t_{i+1}, \ldots, t_k$ in Cvec should be 0.
4. But if such sequence of '0' bits of size $k-i+1 \geq \Delta T$ exists in Cvec then, Cvec-test will fail. This is contradiction.

Hence proved.

Figure 2:
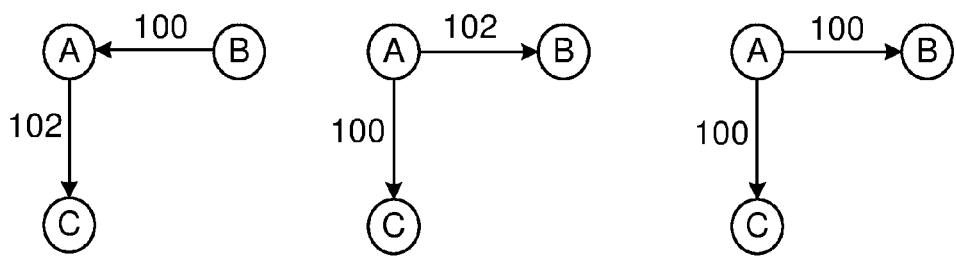
FIG. 2 is a schematic illustration of three different examples of temporal motif subgraphs, in accordance with the present disclosure.
Figure 5:
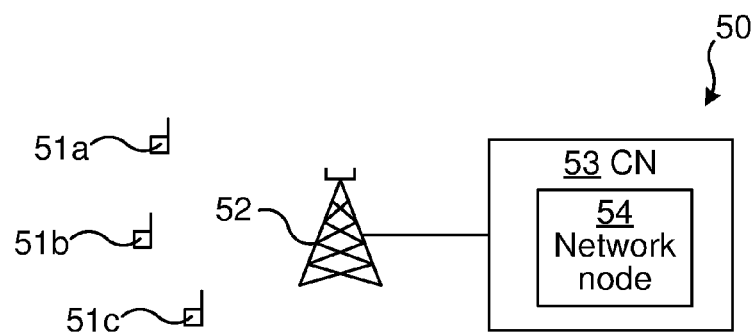
FIG. 5 is a schematic block diagram of an embodiment of a communication network, in accordance with the present disclosure.

In the above discussion in relation to FIGS. 2-4, principles of embodiments of the present disclosure are presented. These may be applied in e.g. a communication network 50 as illustrated in FIG. 5. A plurality of communication devices 51, herein three devices 51a, 51b and 51c are shown but many more may be present, especially in a M2M scenario. The devices 51 may be radio devices and/or wired devices, but are herein shown as radio devices. The radio devices 51 are connected via a base station 52 in a radio access network (RAN) in accordance with a radio access technology (RAT) e.g. an LTE RAT. The RAN is connected to a core network (CN) 53. The network node 54 discussed herein is typically comprised in the CN 53, e.g. in a hosted CN such as a DCP. Via the CN 53, the devices 51 may access e.g. the Internet or another packet data network (PDN).

The radio device 51 may be any device or user equipment (UE), mobile or stationary, enabled to communicate over a radio cannel in a communications network 50, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). Embodiments of the present disclosure may be particularly suitable in cases where the devices 51, or at least some of them, are M2M devices 51.

Figure 6A:
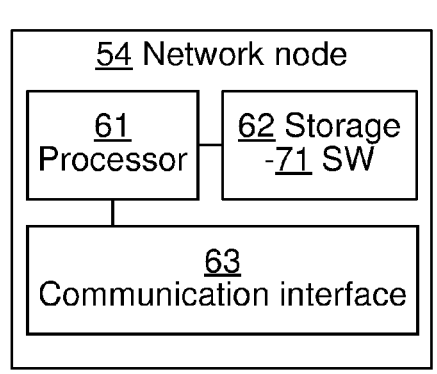
FIG. 6a is a schematic block diagram of an embodiment of a network node, in accordance with the present disclosure.

FIG. 6a schematically illustrates an embodiment of a network node 54 of the present disclosure. The network node 54 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software (SW) 71 (see also FIG. 7) stored in a storage 62 of one or several storage unit(s) e.g. a memory. The storage unit is regarded as a computer readable means 72 (see FIG. 7) as discussed herein and may e.g. be in the form of a Random Access Memory (RAM), a Flash memory or other solid state memory, or a hard disk, or be a combination thereof. The processor circuitry 61 may also be configured to store data in the storage 62, as needed. The network node 54 also comprises a communication interface 63, which may comprise a transmitter and a receiver, which may be combined to form a transceiver or be present as distinct units within the network node 54.

Thus, according to an aspect of the present disclosure, there is provided a network node 54 for a communication network 50, the network comprising a plurality of communication devices 51. The network node 54 is configured for finding temporally connected connection patterns of the communication devices in the network. The network node 54 comprises processor circuitry 61, and a storage unit 62 storing instructions 71 executable by said processor circuitry whereby said network node 54 is operative to identify signalling between the communication devices 51 during a predefined time duration to form a main communication graph F in which the plurality of communication devices are nodes 31. The network node 54 is also operative to partition the main communication graph F for a time period comprised in said time duration to capture temporally connected signalling between some of the communication devices as illustrated in the main communication graph in a partitioned communication graph G. The network node 54 is also operative to form at least one subgraph H from the partitioned communication graph G, comprising a number of m nodes 31 corresponding to a number of m communication devices 51 of said some of the communication devices. The network node 54 is also operative to construct a binary vector 34 of the subgraph G over the time period divided into a plurality of sampling periods corresponding to components 35 in the vector such that, for each component in the vector, the component value is set to "1" if, in accordance with the subgraph, signalling occurs between at least two of them communication devices 51 during the sampling period corresponding to the element, and the component value is otherwise set to "0". The network node 54 is also operative to test whether the signalling between the different m communication devices 51 used for constructing the binary vector 34 is temporally connected by checking that the number of consecutive "0" element(s), if any, between any two "1" elements 35 is less than a predefined $\Delta T$.

Figure 6B:
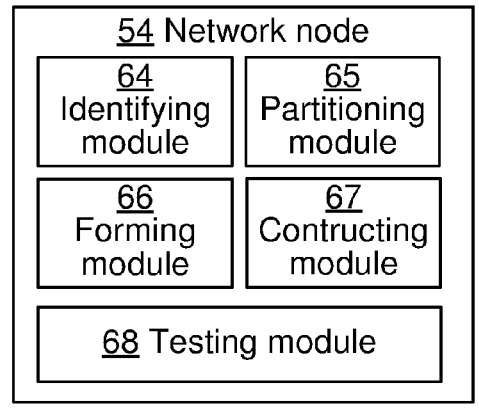
FIG. 6b is another schematic block diagram of an embodiment of a network node, in accordance with the present disclosure.

FIG. 6b is a schematic block diagram functionally illustrating an embodiment of the network node 54 in FIG. 6a. As previously mentioned, the processor circuitry 51 may run software 71 for enabling the network node 54 to perform an embodiment of a method of the present disclosure, whereby functional modules may be formed in network node 54 e.g. in the processor circuitry 51 for performing the different steps of the method. These modules are schematically illustrated as blocks within the network node 54. Thus, the network node 54 comprises an identifying module 64 for identifying signalling between the communication devices 51 during a predefined time duration to form a main communication graph F in which the plurality of communication devices are nodes 31. The network node 54 also comprises a partitioning module 65 for partitioning the main communication graph F for a time period comprised in said time duration to capture temporally connected signalling between some of the communication devices as illustrated in the main communication graph in a partitioned communication graph G. The network node 54 also comprises a forming module 66 for forming at least one subgraph H from the partitioned communication graph G, comprising m nodes 31 corresponding to m communication devices 51 of said some of the communication devices. The network node 54 also comprises a constructing module 67 for constructing a binary vector 34 of the subgraph G over the time period divided into a plurality of sampling periods corresponding to components 35 in the vector such that, for each component in the vector, the component value is set to "1" if, in accordance with the subgraph, signalling occurs between at least two of them communication devices 51 during the sampling period corresponding to the element, and the component value is otherwise set to "0". The network node 54 also comprises a testing module for testing whether the signalling between the different m communication devices 51 used for constructing the binary vector 34 is temporally connected by checking that the number of consecutive "0" element(s), if any, between any two "1" elements 35 is less than a predefined $\Delta T$.

Figure 7:
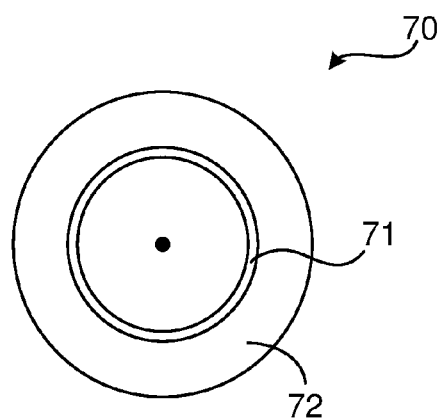
FIG. 7 is a schematic illustration of an embodiment of a computer program product, in accordance with the present disclosure.

FIG. 7 illustrates a computer program product 70. The computer program product 70 comprises a computer readable medium 72 comprising a computer program 71 in the form of computer-executable components 71. The computer program/computer-executable components 71 may be configured to cause a network node 54, e.g. as discussed herein, to perform an embodiment of the method of the present disclosure. The computer program/computer-executable components may be run on the processor circuitry 61 of the network node 54 for causing the network node to perform the method. The computer program product 70 may e.g. be comprised in a storage unit or memory 62 comprised in the network node 54 and associated with the processor circuitry 61. Alternatively, the computer program product 70 may be, or be part of, a separate, e.g. mobile, storage means, such as a computer readable disc, e.g. CD or DVD or hard disc/drive, or a solid state storage medium, e.g. a RAM or Flash memory.

Figure 8:
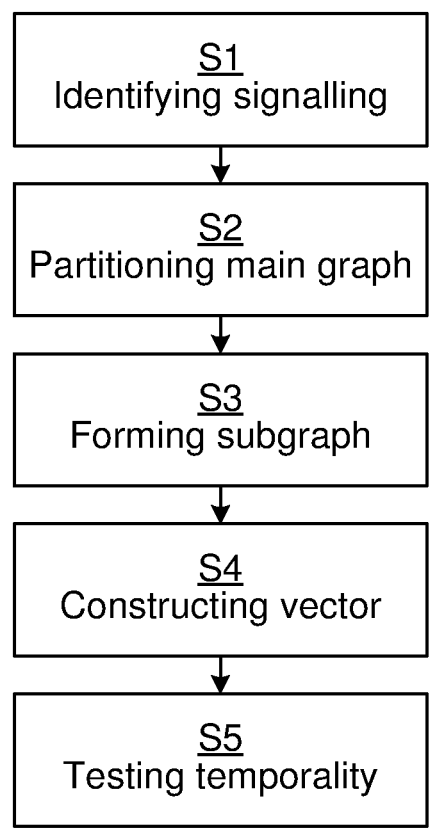
FIG. 8 is a schematic flow chart of an embodiment of a method of the present disclosure, in accordance with the present disclosure.

FIG. 8 is a schematic flow chart of an embodiment of the method of the present disclosure. The method is performed in/by a network node 54 in a communication network 50 comprising a plurality of communication devices 51, for finding temporally connected connection patterns of the communication devices in the network. The network node 54 identifies S1 signalling between the communication devices 51 during a predefined time duration to form a main communication graph F in which the plurality of communication devices are nodes 31. Then, the network node 54 partitions S2 the main communication graph F for a time period comprised in said time duration to capture temporally connected signalling between some of the communication devices as illustrated in the main communication graph in a partitioned communication graph G. The network node 54 then forms S3 at least one subgraph H from the partitioned communication graph G, comprising a number of m nodes 31 corresponding to a number of m communication devices 51 of said some of the communication devices. Then, the network node 54 constructs S4 a binary vector 34 of the subgraph H over the time period divided into a plurality of sampling periods corresponding to components 35 in the vector such that, for each component in the vector, the component value is set to "1" if, in accordance with the subgraph, signalling occurs between at least two of them communication devices 51 during the sampling period corresponding to the element, and the component value is otherwise set to "0". The network node 54 then tests S5 whether the signalling between the different m communication devices 51 used for constructing S4 the binary vector 34 is temporally connected by checking that the number of consecutive "0" element(s), if any, between any two "1" elements 35 is less than a predefined $\Delta T$.

In some embodiments of the present disclosure, the temporally connected connection pattern is a recurring pattern observed during a plurality of time durations. A recurring pattern is more likely to occur again, e.g. in connection with a future outage.

In some embodiments of the present disclosure, a plurality of subgraphs H are formed S3 from the partitioned communication graph G.

In some embodiments of the present disclosure, the temporally connected connection patterns are reconnection patterns after, or disconnection patterns due to, an outage in the communication network 50. In some embodiments, the outage is due to network connectivity loss, power loss, loss of connection to an application or loss of connection to a service.

In some embodiments of the present disclosure, at least some of the plurality of communication devices 51 are M2M devices.

In some embodiments of the present disclosure, at least some of the plurality of communication devices 51 are radio devices.

In some embodiments of the present disclosure, the network node 54 is comprised in a connectivity service platform, e.g. the Ericsson Device Connection Platform (DCP) or other hosted core network (CN) 53.

Example 1

Figure 9:
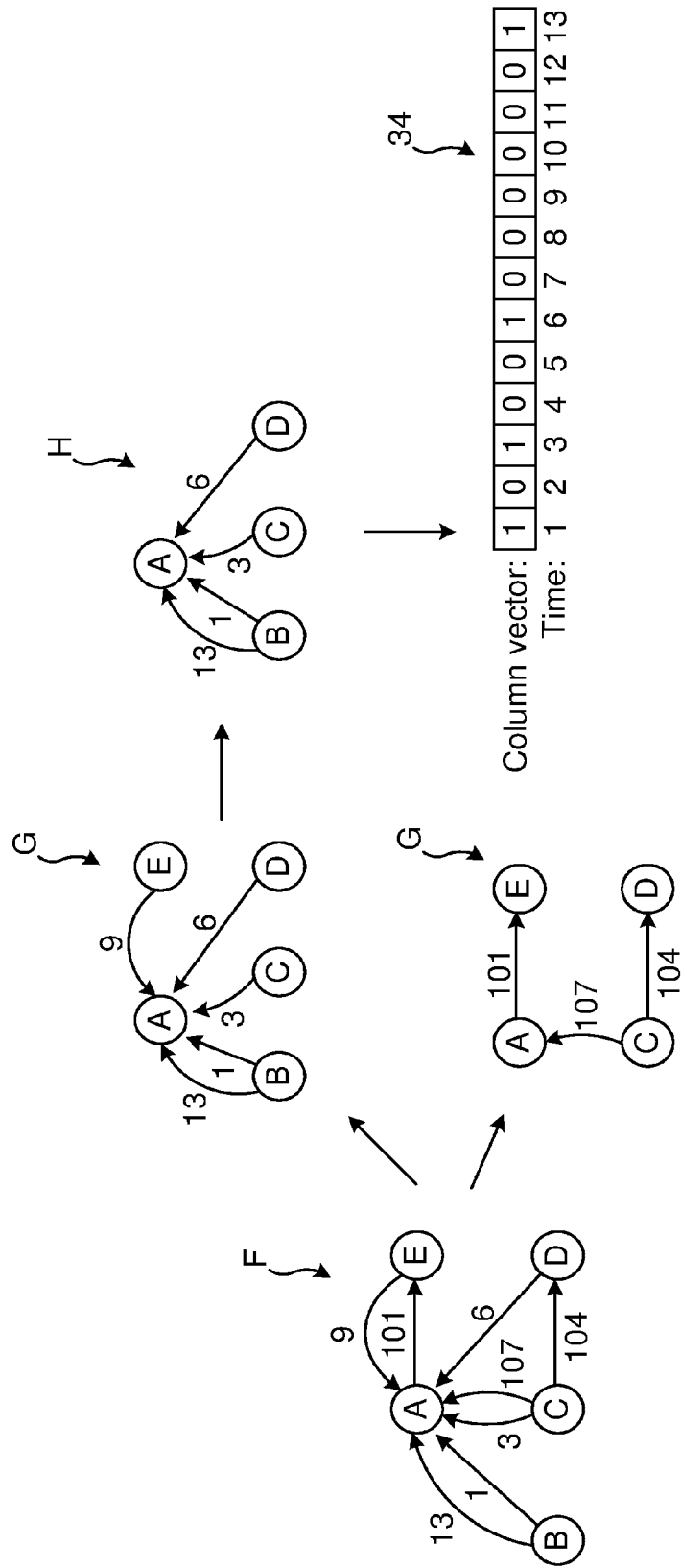
FIG. 9 is a schematic illustration of how a column vector may be formed from a main communication graph in accordance with an example embodiment of the present disclosure, in accordance with the present disclosure.

FIG. 9 is a schematic illustration of how a column vector may be formed from a main communication graph in accordance with an example embodiment of the present disclosure, in accordance with the present disclosure. The example gives an overview of an embodiment of a mining process for identifying a temporal motif.

Graph F is a main communication graph which may e.g. comprise millions of nodes 31, representing millions of devices 51. The two graphs G are partitioned graphs which are partitions of the main communication graph F such that temporal motifs of size m nodes 31 are not affected. The top partitioned graph G is partitioned such that it comprises edges 32 with an early time stamp (1-13), while the bottom partitioned graph G is partitioned such that it comprises edges with a late time stamp (101-107). From the top one of the partitioned graphs G, the subgraph H of size m=4 is formed (see also line 3 of the MiningTemporalMotifs algorithm in Example 2). The corresponding binary vector 34 is shown below the subgraph H (see also line 4 of the MiningTemporalMotifs algorithm in Example 2). Once the binary vector is obtained, the DetectMotifs algorithm of Example 2 may be run on it (see line 5 of the MiningTemporalMotifs algorithm in Example 2). The Cvec test may then be run on the vector 34 in order to confirm that the motif is temporally connected.

Example 2

Example algorithms for different parts of the method of the present disclosure are given in FIGS. 10a, 10b and 11.

FIG. 10a shows an embodiment of a conventional Depth First Search based partition technique used for partitioning S2 the main communication graph F. A similar algorithm was used by Lauri Kovanen et al., called TMFinder.

FIG. 10b shows an embodiment of an algorithm, MiningTemporalMotifs, for mining temporal motifs from a partitioned graph G to form S3 subgraphs H and constructing S4 corresponding binary (column) vectors 34. In the MiningTemporalMotifs algorithm, line 1 iterates through each vertex (i.e. node 31) in MotifVertexList and line 2 iterates through each set of MotifVertexList[vertex]. This basically checks temporal motifs in all enumerated subgraphs H of the partitioned graph G. An induced subgraph H in time period [start, end] is constructed (line 3). A column vector 34 of graph H is constructed (line 4) and the DetectMotifs algorithm is called for each column vector (line 5).

FIG. 11 shows an embodiment of an algorithm, DetectMotifs, for testing S5 the temporal connectedness of the binary vectors 34 constructed S4 by the MiningTemporalMotifs algorithm. The DetectMotifs algorithm detects valid temporal motifs in the column vector 34 using the Cvec-test. The DetectMotifs algorithm finds all the pairs of (startPtr, endPtr) such that the number of consecutive zeros between any two '1' bit between (startPtr, endPtr) is not greater than ΔT (Cvec-test). From lemma 1, we know that a subgraph H identified by Cvec-test is temporally connected.

Example 3

The temporal motif algorithm of Example 2 was executed on four datasets namely phone voice call detail records, mentions in a computerised social network (Twitter), wall posts in a computerised social network (Facebook) and an e-mail dataset. The number of nodes 31 and edges 32 of these datasets are shown in table 2. The duration of the data sets are the number of days during which the available data sets were collected.

TABLE 2

| | Number of nodes | Number of edges | Duration (days) |
|---|---|---|---|
| Call detail records | 1494123 | 173215655 | 60 |
| Mentions | 4979882 | 26545670 | 30 |
| Wall posts | 45813 | 855539 | 1540 |
| E-mail | 13776 | 121050 | 348 |

Call detail records contain information related to each call such as caller number, callee number, time of call, duration and various other details. Here are include only those calls whose duration ≥10 sec as a pre-processing step.

The Twitter mentions graph is constructed as follows if a twitter user X mentions other user Y with "@Y" in his tweet, then a directed edge is created from node X to node Y. A twitter user can mention one or more user in same tweet and hence graph has overlapping time edges 32.

For the email graph, if one person X sends an email to one or more person at time t, in the graph it is represented as an directed edge 32 from node X to each person node 31 with t as edge label. An email is included if the total number of receivers in the email is 25 persons as a pre-processing step.

The Facebook wall posts graph is constructed such that if a user X posts a message on wall of another user Y, then a directed edge 32 from node X is created to node Y. Note that the time duration of facebook graph is 1540 days (~4 years) and it is still possible to efficiently detect motifs with one second granularity in accordance with embodiments of the present disclosure.

Figure 12:
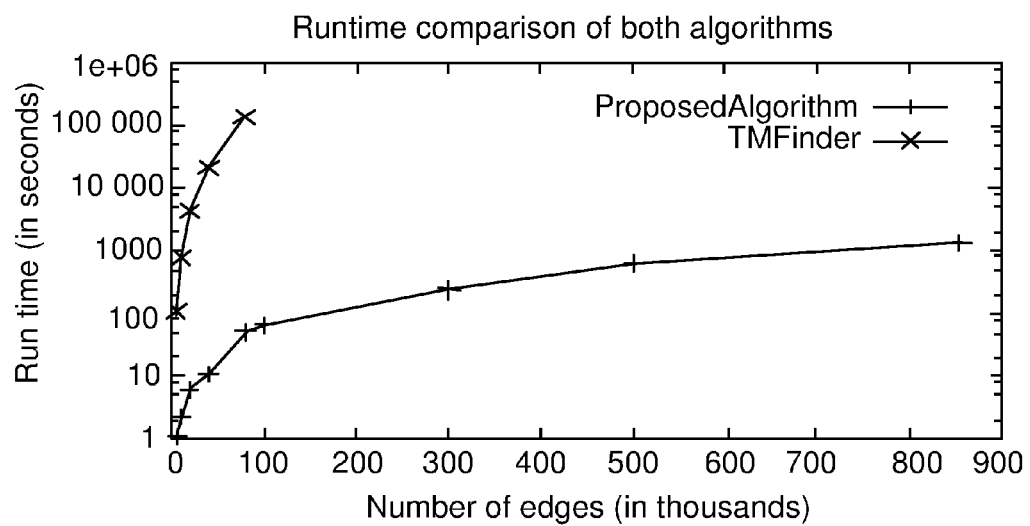
FIG. 12 is a graph over the runtime of a method embodiment of the present disclosure compared with a prior art algorithm.

FIG. 12 is a graph comparing the run times of a method of the present disclosure in accordance with the algorithms discussed in Example 2 and the corresponding run times for the TMFinder of prior art. The data set used was the wall posts of a computerised social network.

The method of the present disclosure was 100 times faster than TMFinder. Though TMFinder counts motif edges as motif size while the proposed algorithm counts motif nodes as motif size m. The TMFinder failed to detect temporal motifs when the dataset edges were 0.1 million and more.

As mentioned the method of the TMFinder partitions the main communication graph F in a similar way as per the present disclosure. However, then it transforms the partitioned graph into a line graph, mines m size temporal motifs and converts the m-size line graph into an induced graph. This method has two major issues in real world networks which are scalability and failing to detect temporal motifs on networks which has simultaneous links. The method of the present disclosure is instead based on the binary column vector 34 and does not suffer from those problems.

Example 4

Figure 13:
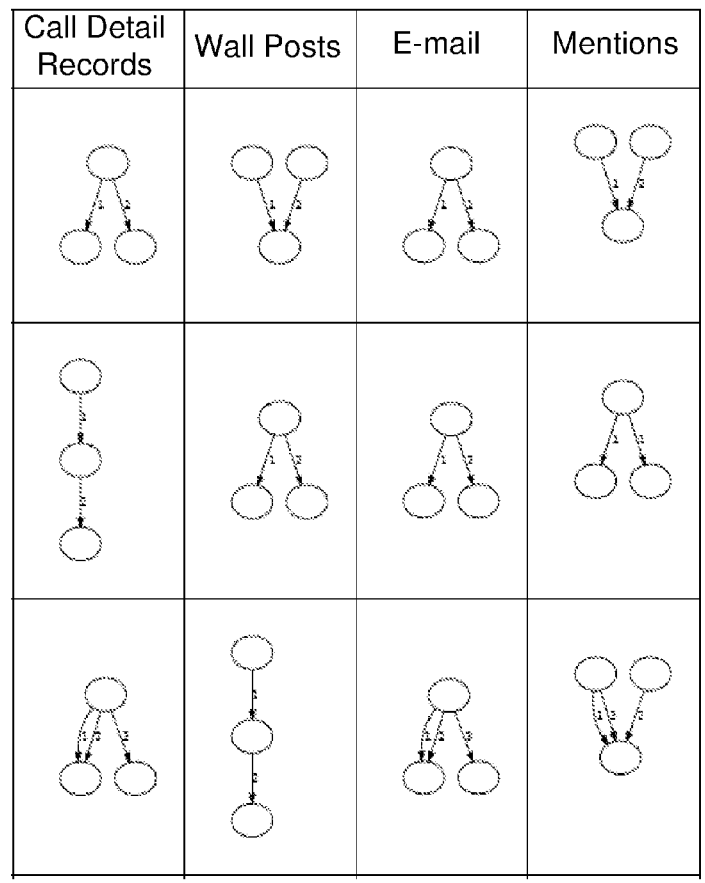
FIG. 13 illustrates some temporal motifs of size m=3 from different example datasets, in accordance with the present disclosure.

FIG. 13 shows examples of temporal motifs of m=3 (i.e. with three nodes 31) identified in the four datasets of Example 3 by means of embodiments of the method of the present disclosure.

The parameter ΔT is selected as one hour for wall posts, e-mails and call detail records, and one min for the mentions dataset. The choice of ΔT depends on the communication frequency among nodes 31 in the main communication graph F.

Motifs may be interpreted such that nodes 31 are people and edge labels denote the relative temporal sequence of interaction. For example, in the wall-posts graph F, the first motif may be interpreted as two people writing one after other on the wall of one person who for example has a birthday or anniversary.

Figure 14:
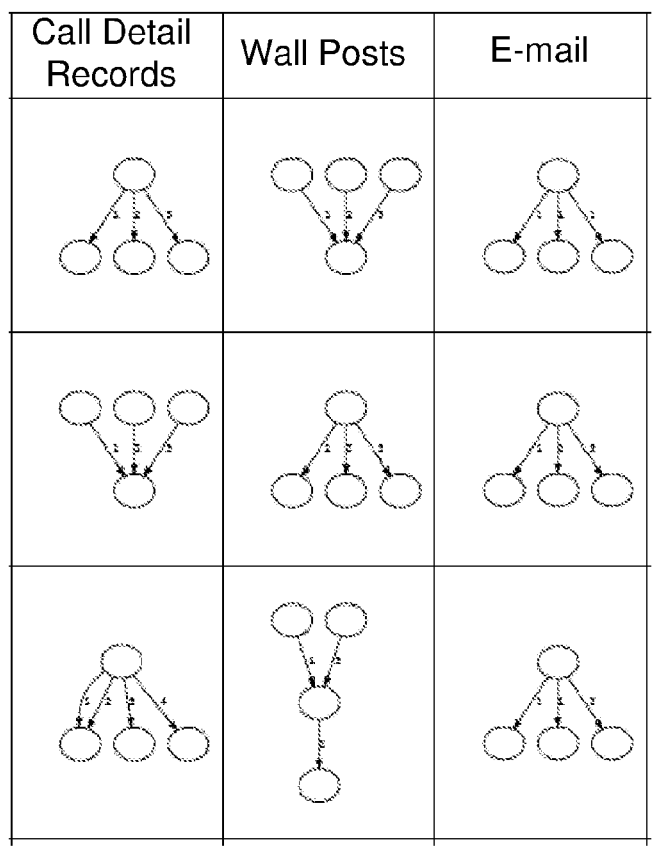
FIG. 14 illustrates some temporal motifs of size m=4 from different example datasets, in accordance with the present disclosure.

FIG. 14 similarly shows examples of temporal motifs of m=4 (i.e. with four nodes 31) identified in the four datasets of Example 3 by means of embodiments of the method of the present disclosure.

Example 5

Figure 15:
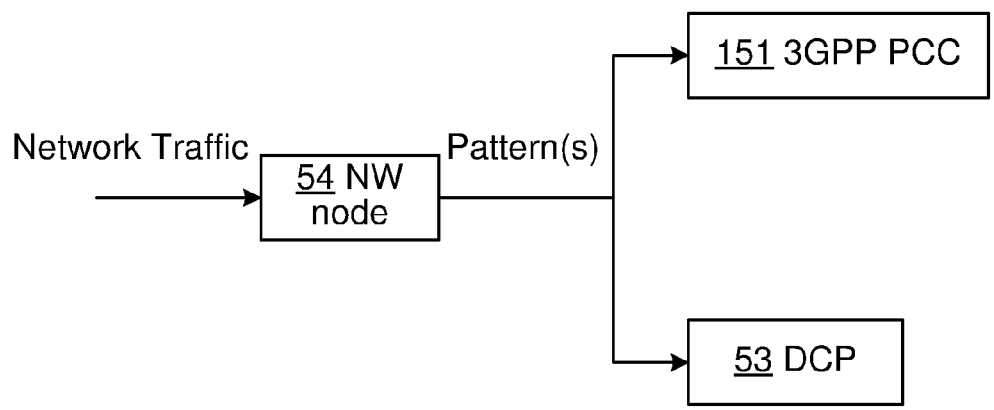
FIG. 15 is a schematic block diagram illustrating embodiments of how found temporally connected connection patterns are provided to nodes in the communication network, in accordance with the present disclosure.

Embodiments of the present disclosure may be used to identify input patterns for DCP and PCC nodes, especially in a M2M network 50 by an operator during an outage recovery. FIG. 15 shows an example of how a network (NW) node 54 may identify the temporal reconnect patterns and give them as input to PCC 151 and/or hosted CN/DCP 53 nodes for improved handling of similar reconnection events, e.g. after an outage.

The method of the present disclosure may become basis for network operators making policies or profiles relating to PCC and DCP in efficiently managing a M2M network 50 with respect to number of devices 51, types of devices, types of patterns of reconnection (as per time, location, network-performance, heterogeneous cell sites). Further, such time varying pattern identification in an unevenly performing network would help operators to tune parameters like load on Device Connectivity Platform (DCP), Service capability layers etc. Operators may prioritize or de-prioritize some patterns over others according to any of the predefined criteria during recovery at a time in an uneven performing 3GPP network environment. The criteria could include:

Application tuning, like stabilizing the application in view of different devices reconnect patterns impacting its efficient work flow at a time.

Network performance tuning, like managing the network nodes, cell sites load and impact at different locations in view of different devices reconnect patterns hitting the nodes.

Platform tuning, or related cloud based virtual resources (storage, memory, hardware, server etc.) allocations as per devices reconnect patterns hitting the network at a time.

Network traffic/load tuning, like which type of devices, types based patterns are more prevalent at a time in the reconnect based network traffic so as to tune the related network traffic at a time.

Figure 16:
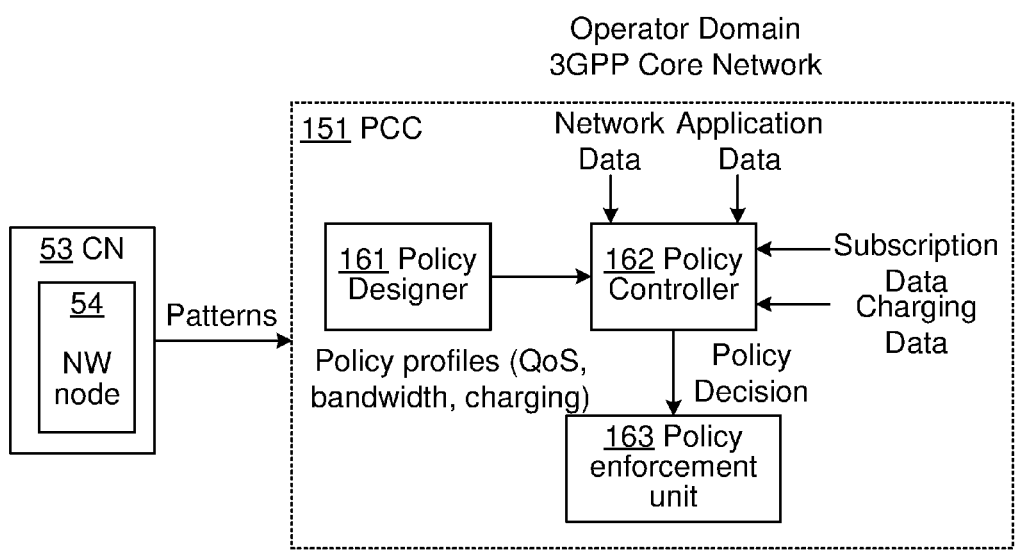
FIG. 16 is a schematic block diagram illustrating embodiments of how found temporally connected connection patterns are used by a policy controller in the core network of the communication network, in accordance with the present disclosure.

For example: System identified patterns as input to Policy Charging and Control Node (PCC) in the core network 53 as illustrated in FIG. 16. The temporally connected connection patterns/motifs obtained from the method of the present disclosure by the network node 54, e.g. in or otherwise associated with a hosted CN 53 such as DCP, is sent to the operator CN. The PCC Policy designer 161 understands the reconnection patterns relating to recovery from outages to create various policy profiles relating to QoS, bandwidth and charging. Policy profiles get activated when the policy controller 162 detects traffic fulfilling the policy profiles. Then policy decisions relating to the respective profiles are shared with the enforcing unit 163 to enforce them to tune the communication network 54.

Below follow another aspect of the present disclosure.

According to an aspect of the present disclosure, there is provided a network node 54 for a communication network 50 comprising a plurality of communication devices 51, configured for finding temporally connected connection patterns of the communication devices in the network. The network node comprises means (e.g. comprising the identifying module 64) for identifying S1 signalling between the communication devices 51 during a predefined time duration to form a main communication graph F in which the plurality of communication devices are nodes 31. The network node 54 also comprises means (e.g. comprising the partitioning module 65) for partitioning S2 the main communication graph F for a time period comprised in said time duration to capture temporally connected signalling between some of the communication devices as illustrated in the main communication graph in a partitioned communication graph G. The network node 54 also comprises means (e.g. comprising the forming module 66) for forming S3 at least one subgraph H from the partitioned communication graph G, comprising m nodes 31 corresponding to m communication devices 51 of said some of the communication devices. The network node 54 also comprises means (e.g. comprising the constructing module 67) for constructing S4 a binary vector 34 of the subgraph G over the time period divided into a plurality of sampling periods corresponding to components 35 in the vector such that, for each component in the vector, the component value is set to "1" if, in accordance with the subgraph, signalling occurs between at least two of the m communication devices 51 during the sampling period corresponding to the element, and the component value is otherwise set to "0". The network node 54 also comprises means (e.g. comprising the testing module 68) for testing S5 whether the signalling between the different m communication devices 51 used for constructing S4 the binary vector 34 is temporally connected by checking that the number of consecutive "0" element(s), if any, between any two "1" elements 35 is less than a predefined $\Delta T$.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network node in a communication network comprising a plurality of communication devices, for finding temporally connected connection patterns of the communication devices in the network, the method comprising:
   identifying signalling between the communication devices during a predefined time duration to form a main communication graph in which the plurality of communication devices are nodes;
   partitioning the main communication graph for a time period comprised in said predefined time duration to capture temporally connected signalling between a group of the plurality of communication devices as illustrated in the main communication graph in a partitioned communication graph;
   forming at least one subgraph from the partitioned communication graph, said subgraph comprising m nodes corresponding to m communication devices of said group of the plurality of communication devices, where m>1;
   constructing a binary vector of the subgraph over the time period divided into a plurality of sampling periods corresponding to components in the binary vector such that, for each component in the binary vector, a component value of the component is set to "1" if, in accordance with the subgraph, signalling occurs between at least two of the m communication devices during the sampling period corresponding to the component, and the component value of the component is otherwise set to "0"; and testing whether the signalling between the different m communication devices used for constructing the binary vector is temporally connected by checking that a number of consecutive "0" component values of the components of the binary vector, if any, between any two "1" component values of the components of the binary vector is less than a predefined value.

2. The method of claim 1, wherein the temporally connected connection pattern is a recurring pattern observed during a plurality of time durations.

3. The method of claim 1, wherein a plurality of subgraphs are formed from the partitioned communication graph.

4. The method of claim 1, wherein the temporally connected connection patterns are reconnection patterns after, or disconnection patterns due to, an outage in the communication network.

5. The method of claim 4, wherein the outage is due to network connectivity loss, power loss, loss of connection to an application or loss of connection to a service.

6. The method of claim 1, wherein at least two of the plurality of communication devices are machine-to-machine (M2M) devices.

7. The method of claim 1, wherein at least two of the plurality of communication devices are radio devices.

8. The method of claim 1, wherein the network node is comprised in a connectivity service platform, e.g. the Ericsson Device Connection Platform (DCP) or other hosted core network (CN).

9. A computer program product comprising a non-transitory computer readable medium storing computer-executable components for causing a network node to perform the method of claim 1 when the computer-executable components are run on processor circuitry comprised in the network node.

10. A network node for a communication network comprising a plurality of communication devices, configured for finding temporally connected connection patterns of the communication devices in the network, the network node comprising:
   processor circuitry; and
   a storage unit storing instructions executable by said processor circuitry whereby said network node is operative to:
   identify signalling between the communication devices during a predefined time duration to form a main communication graph in which the plurality of communication devices are nodes;
   partition the main communication graph for a time period comprised in said predefined time duration to capture temporally connected signalling between a group of the plurality of communication devices as illustrated in the main communication graph in a partitioned communication graph;
   form at least one subgraph from the partitioned communication graph, said subgraph comprising m nodes corresponding to m communication devices of said group of the plurality of communication devices, wherein m>1;
   construct a binary vector of the subgraph over the time period divided into a plurality of sampling periods corresponding to components in the binary vector such that, for each component in the binary vector, a component value of the component is set to "1" if, in accordance with the subgraph, signalling occurs between at least two of the m communication devices during the sampling period corresponding to the component, and the component value of the component is otherwise set to "0"; and
   test whether the signalling between the different m communication devices used for constructing the binary vector is temporally connected by checking that a number of consecutive "0" component values of the components of the binary vector, if any, between any two "1" component values of the components of the binary vector is less than a predefined value.

11. The network node of claim 10, wherein at least two of the plurality of communication devices are machine-to-machine (M2M) devices.

12. The network node of claim 10, wherein at least two of the plurality of communication devices are radio devices.

13. The network node of claim 10, wherein the network node is configured for being comprised in a connectivity service platform, e.g. the Ericsson Device Connection Platform (DCP) or other hosted core network (CN).

14. A computer program product comprising a non-transitory computer readable medium storing a computer program for finding temporally connected connection patterns of communication devices in a communication network, the computer program comprising computer program code which is able to, when run on processor circuitry of a network node in the communication network, cause the network node to:
   identify signalling between the communication devices during a predefined time duration to form a main communication graph in which the plurality of communication devices are nodes;
   partition the main communication graph for a time period comprised in said predefined time duration to capture temporally connected signalling between a group of the plurality of communication devices as illustrated in the main communication graph in a partitioned communication graph;
   form at least one subgraph from the partitioned communication graph, said subgraph comprising m nodes corresponding to m communication devices of said group of the plurality communication devices, where m>1;
   construct a binary vector of the subgraph over the time period divided into a plurality of sampling periods corresponding to components in the binary vector such that, for each component in the binary vector, a component value of the component is set to "1" if, in accordance with the subgraph, signalling occurs between at least two of the m communication devices during the sampling period corresponding to the component, and the component value of the component is otherwise set to "0"; and
   test whether the signalling between the different m communication devices used for constructing the binary vector is temporally connected by checking that a number of consecutive "0" component values of the components of the binary vector, if any, between any two "1" component values of the components of the binary vector is less than a predefined value.

* * * * *